(12) United States Patent
Duncan et al.

(10) Patent No.: US 9,617,646 B2
(45) Date of Patent: Apr. 11, 2017

(54) COMMINUTION WATER CONTAMINANT REMOVAL SYSTEM

(71) Applicant: Elwha LLC, Bellevue, WA (US)

(72) Inventors: William D. Duncan, Kirkland, WA (US); Roderick A. Hyde, Redmond, WA (US); Jordin T. Kare, Seattle, WA (US); Nathan P. Myhrvold, Medina, WA (US); Clarence T. Tegreene, Mercer Island, WA (US); Charles Whitmer, North Bend, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 977 days.

(21) Appl. No.: 13/676,814

(22) Filed: Nov. 14, 2012

(65) Prior Publication Data
US 2014/0131222 A1  May 15, 2014

(51) Int. Cl.
| C25C 7/00 | (2006.01) |
| C02F 1/46 | (2006.01) |
| C25B 15/02 | (2006.01) |
| C25C 1/00 | (2006.01) |
| C02F 1/461 | (2006.01) |
| C02F 101/18 | (2006.01) |
| C02F 101/20 | (2006.01) |

(52) U.S. Cl.
CPC .......... *C25B 15/02* (2013.01); *C02F 1/46109* (2013.01); *C25C 1/00* (2013.01); *C25C 7/00* (2013.01); *C02F 2001/46152* (2013.01); *C02F 2101/18* (2013.01); *C02F 2101/20* (2013.01); *C02F 2201/4611* (2013.01); *C02F 2201/46125* (2013.01)

(58) Field of Classification Search
CPC .... C02F 1/46109; C02F 1/461; C02F 1/4604; C02F 2001/46152; C02F 2101/20; C02F 2101/203; C02F 2101/206; C02F 2101/22; C02F 2201/4611; C25C 7/00
See application file for complete search history.

(56) References Cited

U.S. PATENT DOCUMENTS

| 4,139,432 A | 2/1979 | Ghiringhelli et al. |
| 4,226,695 A | 10/1980 | Matson |
| 4,288,303 A | 9/1981 | Matson |

(Continued)

FOREIGN PATENT DOCUMENTS

EP  1017633 B1  5/2005

OTHER PUBLICATIONS

PCT International Search Report; International App. No. PCT/US2013/069815; Jan. 23, 2014; pp. 1-3.

*Primary Examiner* — Steven A. Friday
(74) *Attorney, Agent, or Firm* — Foley & Lardner LLP (57) ABSTRACT

An electrochemical reactor for removing mining constituents from a fluid is disclosed. The electrochemical reactor includes a housing defining a flow path and a pump configured to continuously move fluid through the flow path at a flow rate. The electrochemical reactor also includes a power supply coupled to the housing, an anode and a cathode coupled to the power supply, and a controller configured to selectively engage the power supply power supply. The power supply applies an electrical potential between the anode and the cathode when engaged.

37 Claims, 4 Drawing Sheets

(56) References Cited

U.S. PATENT DOCUMENTS

| | | | |
|---|---|---|---|
| 4,329,211 A | 5/1982 | Plantes et al. | |
| 4,537,666 A | 8/1985 | Murray et al. | |
| 5,108,563 A | 4/1992 | Cook | |
| 5,423,962 A | 6/1995 | Herbst | |
| 5,425,858 A | 6/1995 | Farmer | |
| 5,858,199 A | 1/1999 | Hanak | |
| 5,863,413 A * | 1/1999 | Caren | B01D 53/90 204/157.5 |
| 6,146,507 A * | 11/2000 | Gustafson | C02F 1/461 204/275.1 |
| 6,238,546 B1 | 5/2001 | Knieper et al. | |
| 6,682,646 B2 | 1/2004 | Wood et al. | |
| 6,896,790 B1 * | 5/2005 | Maekawa | B01D 53/32 204/164 |
| 6,960,301 B2 | 11/2005 | Bradley | |
| 7,264,732 B2 | 9/2007 | Bradley | |
| 7,404,900 B2 | 7/2008 | Bradley | |
| 7,695,607 B2 | 4/2010 | Polnicki et al. | |
| 2002/0056688 A1 | 5/2002 | Stephenson et al. | |
| 2003/0173300 A1 | 9/2003 | Bradley | |
| 2004/0108222 A1 * | 6/2004 | Gattrell | C02F 1/46109 205/758 |
| 2004/0168909 A1 | 9/2004 | Larson | |
| 2004/0251213 A1 * | 12/2004 | Bradley | C02F 1/463 205/676 |
| 2005/0247571 A1 | 11/2005 | Grigg | |
| 2006/0021942 A1 | 2/2006 | Bradley | |
| 2007/0295666 A1 | 12/2007 | Bradley | |
| 2009/0127119 A1 * | 5/2009 | Witte | C02F 1/008 204/662 |
| 2009/0205971 A1 * | 8/2009 | Pentz | C25B 1/04 205/341 |
| 2010/0140092 A1 * | 6/2010 | Volkel | B01D 61/422 204/522 |
| 2011/0132747 A1 * | 6/2011 | Houser | C25B 1/04 204/230.3 |

* cited by examiner

COMMINUTION WATER CONTAMINANT REMOVAL SYSTEM

BACKGROUND

Fluid decontamination is a process whereby various materials are removed to facilitate the proper disposal of the fluid. Various processing agents, comminution water, or other fluids are commonly utilized in the mining process, and these processing agents may require special disposal processes due to the presence of certain chemicals. Mining is the process of removing desired in-ground materials or minerals. Such materials may include precious metals, oil, gas, and other mined substances. By way of example, processing agents may interact with ore particles to facilitate the removal of a mineral, such as gold. After use, the processing agents, or mine tailings, may include various constituents acquired from the ore such as mercury or arsenic. Further, comminution water may include various chemicals, such as cyanide, to facilitate the comminution process. A mining operation may prefer to remove these constituents or chemicals prior to disposing of the processing agents, comminution water, or other liquids.

One traditional method for disposing of processing agents includes releasing them into the surrounding environment. However, releasing certain processing agents may pose environmental concerns. Another method includes storing the spent processing agents and transporting them to an offsite decontamination facility. Safely storing the spent processing agents involves various containers designed to prevent the agents from leaking into the surrounding environment. Further, such storage and transportation may be costly and labor intensive due to the expense of appropriate storage containers and the distances between mining operations and decontamination facilities.

SUMMARY

One exemplary embodiment relates to an electrochemical reactor for removing contaminants from a fluid. The electrochemical reactor includes a housing having a plurality of channels defining flow paths, a power supply coupled to at least one of the plurality of channels, an anode and a cathode coupled to the power supply, and a controller configured to selectively engage the power supply. The power supply applies an electrical potential between the anode and the cathode when engaged.

Another exemplary embodiment relates to a method for removing contaminants from a fluid using electrodeposition. The method includes providing an electrochemical reactor including a housing that includes a plurality of channels defining hydraulically parallel flow paths. The method also includes applying an electrical potential across at least one of the plurality of channels with a power supply and controlling the application of the electrical potential with a module.

Still another exemplary embodiment relates to a method for deplating electroplated materials in an electrochemical reactor. The method includes providing an electrochemical reactor having a housing that defines a flow path, providing a fluid having a first constituent and a second constituent within the housing, and causing the fluid to be moved through the flow path. The method also includes electroplating the first constituent and the second constituent from the fluid onto the housing and selectively recovering at least one of the first constituent and the second constituent by deplating them from the housing with a power supply controlled by a module.

Yet another exemplary embodiment relates to a method for deplating electroplated materials from an electrochemical reactor. The method includes providing an electrochemical reactor comprising a housing, wherein the housing defines a flow path, providing a fluid having a first constituent and a second constituent within the housing, and moving the fluid through the flow path. The method also includes selectively depositing at least one of the first constituent and the second constituent onto the housing with a power supply controlled by a module, selectively recovering at least one of the first constituent and the second constituent by deplating them from the housing with the power supply, and concentrating at least one of the first constituent and the second constituent within the fluid using flow-phased recovery.

The disclosed embodiments is capable of other embodiments and of being carried out in various ways. Alternative exemplary embodiments relate to other features and combinations of features as may be generally recited in the claims.

BRIEF DESCRIPTION OF THE FIGURES

The embodiments disclosed will become more fully understood from the following detailed description taken in conjunction with the accompanying drawings wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
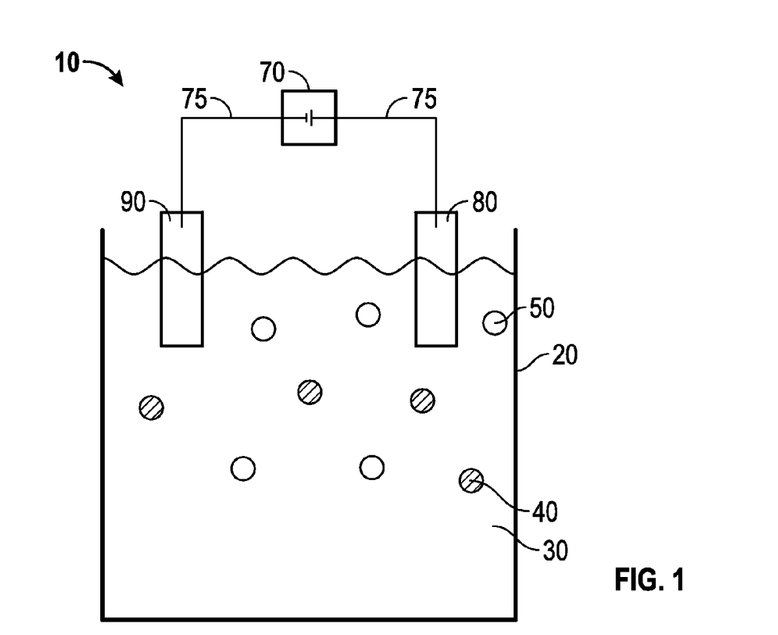
FIG. 1 is an elevation view of an electrochemical reactor.

Referring first to the exemplary embodiment shown in FIG. 1, an electrolytic process is performed using an electrolysis processing unit, shown as electrochemical reactor 10. Such an electrochemical reactor 10 may be designed to conduct a variety of electrochemical reactions (e.g., electrodeposition, electrodialysis, reactive electrodialysis, electroosmosis, electroflotation, etc.). As shown in FIG. 1, electrochemical reactor 10 is designed to perform an electrodeposition process. According to an exemplary embodiment, electrochemical reactor 10 electrochemically separates various contaminants from liquids to facilitate safe disposal or reuse of the liquid.

As shown in FIG. 1, electrochemical reactor 10 includes a structural member, shown as housing 20. According to an exemplary embodiment, housing 20 includes a plurality of sidewalls and a bottom element. Housing 20 may be formed from various materials (e.g., aluminum, steel, etc.) and may include an internal coating (e.g., a ceramic, a polymer, a metal, etc.). According to one embodiment, housing 20 is manufactured by bending a sheet of material to form the sidewalls and bottom element. According to an alternative embodiment, housing 20 may include various thin wall configurations formed using another process (e.g., extrusion, casting, fastening several subcomponents, etc.). According to still another alternative embodiment, housing 20 includes a plurality of channels defining flow paths. Such channels may vary in size (e.g., five centimeters, one centimeter, one millimeter, one micrometer, etc.) and shape (e.g., rectangular, ovular, hexagonal, etc.).

Referring still to the exemplary embodiment shown in FIG. 1, electrochemical reactor 10 includes a fluid, shown as solution 30. According to an exemplary embodiment, solution 30 is an unpurified fluid. Such an unpurified fluid may include water containing bacteria or undesirable minerals. According to an alternative embodiment, solution 30 is a waste fluid. By way of example, a waste fluid may include wastewater, another industrial waste, or comminution water utilized in a mining operation. According to still another alternative embodiment, solution 30 includes mine tailings.

As shown in FIG. 1, solution 30 is disposed within housing 20. By way of example, solution 30 may be pumped into housing 20 through an aperture within a sidewall or a bottom element of housing 20. As shown in FIG. 1, solution 30 is pumped into housing 20 through an open upper portion. Such a solution 30 disposed within a housing 20 having an open upper portion is exposed to a surrounding environment. Where the surrounding environment is an atmospheric environment, solution 30 may experience atmospheric pressure (e.g., one atmosphere, 14.7 pounds per square inch, etc.).

According to the exemplary embodiment shown in FIG. 1, solution 30 is an aqueous solution containing a first constituent particle, shown as first contaminant 40 and a second constituent particle, shown as second contaminant 50. As shown in FIG. 1, first contaminant 40 and second contaminant 50 are suspended within solution 30. According to an alternative embodiment, first contaminant 40 and second contaminant 50 may be settled and not dissolved within solution 30 (i.e. positioned along a bottom surface of housing 20). According to still another alternative embodiment, first contaminant 40 and second contaminant 50 may be otherwise mixed within solution 30 (e.g., homogeneously, non-homogeneously, partially suspended, etc.).

According to an exemplary embodiment, first contaminant 40 and second contaminant 50 include a plurality of different compounds. According to an exemplary embodiment, at least one of first contaminant 40 and second contaminant 50 is cyanide, mercury, or arsenic. According to an alternative embodiment, at least one of first contaminant 40 and second contaminant 50 is a mineral (e.g., gold, silver, etc.). Such compounds may include a single element or a plurality of elements bonded together. According to an exemplary embodiment, at least one of first contaminant 40 and second contaminant 50 is an ionized chemical in elemental form or an ionic compound. Such an ionized chemical in elemental form or ionic compound may have a positive net charge (i.e. more protons than electrons) or a negative net charge (i.e. more electrons than protons). According to an alternative embodiment, first contaminant 40 and second contaminant 50 have a zero net charge (i.e. an equal number of protons and electrons).

Referring still to the exemplary embodiment shown in FIG. 1, electrochemical reactor 10 includes an electrical energy source, shown as power supply 70. Power supplies are construed to have means for control and recording of current and voltage as a function of time. According to an exemplary embodiment, power supply 70 is a battery capable of storing electrical energy. Such a battery may transfer electrical energy in the form of direct current to other components of electrochemical reactor 10 but may need to receive electrical energy to maintain continuous operation (e.g., recharge the battery upon depletion or when the stored energy reaches a threshold level). According to an alternative embodiment, power supply 70 is a rectifier system. A rectifier system converts incoming alternating current into direct current for use within electrochemical reactor 10. Where power supply 70 is a rectifier system, electrochemical reactor 10 may operate continuously thereby facilitating the constant decontamination of solution 30. According to still another alternative embodiment, power supply 70 is another known energy system capable of producing electrical energy (e.g., fuel cell, hydrogen cell, generator, etc.).

As shown in FIG. 1, power supply 70 is coupled to a first electrode, shown as anode 80 and a second electrode, shown as cathode 90. According to the exemplary embodiment shown in FIG. 1, such coupling is accomplished through the use of one or more energy transfer devices, shown as leads 75. According to an exemplary embodiment, anode 80 and cathode 90 each include an exposed portion positioned within solution 30. As shown in FIG. 1, anode 80 and cathode 90 may be spaced a distance apart. According to an alternative embodiment, anode 80 may be positioned within housing 20 proximate to (i.e. 0.01 cm from, 0.1 cm from, etc.) cathode 90.

According to an exemplary embodiment, anode 80 and cathode 90 transfer electricity from power supply 70 into solution 30. As shown in FIG. 1, power supply 70 may include a current delivering terminal coupled to anode 80 through lead 75 and a current receiving terminal coupled to cathode 90 through lead 75. Such a configuration allows for electrons to flow from anode 80, through power supply 70, and towards cathode 90. Electrons proximate cathode 90 allow for a reduction reaction to occur proximate cathode 90.

According to an exemplary embodiment, electrochemical reactor 10 deposits one of first contaminant 40 and second contaminant 50 through electrodeposition. According to an exemplary embodiment, the electrodeposition process involves anodic deposition where ions having a negative net charge are deposited onto the surface of anode 80. The anodic deposition of first contaminant 40 or second contaminant 50 involves an oxidation reaction where an ionic first contaminant 40 or ionic second contaminant 50 adheres (i.e. deposits, clings, interfaces, etc.) to anode 80, loses electrons, and enter a zero valence state. According to an alternative embodiment, the electrodeposition process involves cathodic deposition where ions having a positive net charge are deposited onto a surface of cathode 90. The cathodic deposition of first contaminant 40 or second contaminant 50 involves a reduction reaction where an ionic first contaminant 40 or an ionic second contaminant 50 adhere (i.e. deposits, clings, interfaces, etc.) to cathode 90, gain electrons, and enter a zero valence state.

According to an exemplary embodiment, the electrodeposition process continues until solution 30 has been treated such that a preferred amount of first contaminant 40 or second contaminant 50 has been removed. According to an exemplary embodiment, substantially all (i.e. more than ninety percent of the particles) of first contaminant 40 or second contaminant 50 is removed due to the electrodeposition process of electrochemical reactor 10. The electrodeposition process may involve a processing rate (i.e. elapsed time) needed to treat a volume of solution 30 under the operating conditions (e.g., potential, current, etc.) of power supply 70 and the physical configuration of electrochemical reactor 10.

According to an exemplary embodiment, anode 80 and cathode 90 may be manufactured from various known materials. According to an exemplary embodiment, anode 80 and cathode 90 are manufactured from an inert conductive material (e.g., platinum, gold, graphite, a noble metal, another carbon-based material, etc.). Such inert conductive materials prevent anode 80 and cathode 90 from participating in the electrolytic reaction thereby reducing the prevalence of ions dispersed within solution 30. According to an alternative embodiment, anode 80 and cathode 90 are manufactured from another material configured to partake in an electrolytic reaction (e.g., copper, nickel, etc.). Anode 80 and cathode 90 may be manufactured from the same or different materials.

Figure 2:
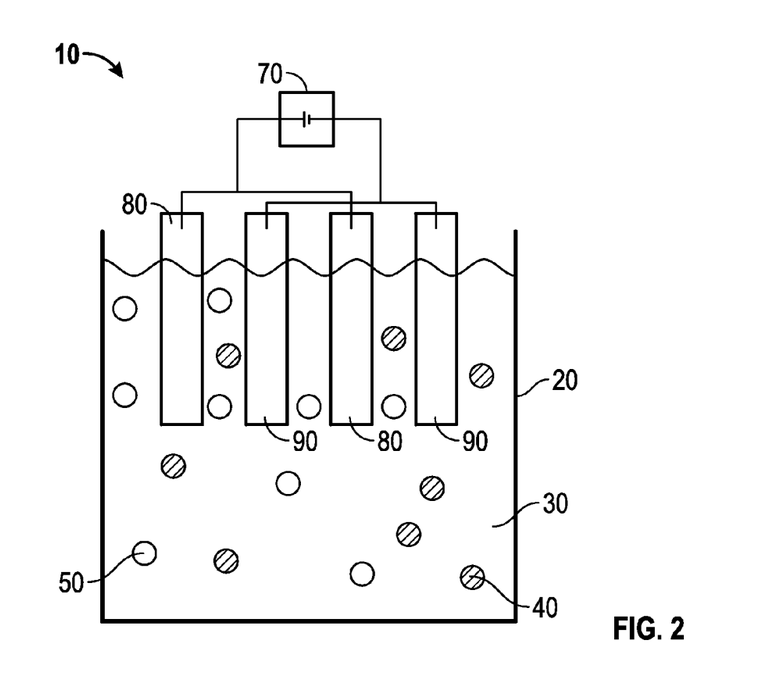
FIG. 2 is an elevation view of an electrochemical reactor having a plurality of anodes and electrodes.

Referring next to the embodiment shown in FIG. 2, which is a variation of the exemplary embodiment shown in FIG. 1, electrochemical reactor 10 is configured to more expediently deposit first contaminant 40 or second contaminant 50 onto cathodes 90. Such an electrochemical reactor 10 may be used to flash treat a volume of solution 30. As shown in FIG. 2, electrochemical reactor 10 includes a plurality of anodes 80 and cathodes 90 each having a portion disposed within solution 30. According to an exemplary embodiment, such a configuration increases the total surface area of anodes 80 and cathodes 90 exposed to solution 30 thereby reducing the time necessary to treat solution 30. According to an exemplary embodiment, anodes 80 are spaced less than 1.0 centimeters from cathodes 90 thereby further increasing the processing rate and decreasing the time needed to treat solution 30.

Referring still to the exemplary embodiment shown in FIG. 2, the plurality of anodes 80 coupled to a current delivering lead of power supply 70 and a plurality of cathodes 90 coupled to a current receiving lead of power supply 70 produces a deposition of first contaminant 40 or second contaminant 50 onto the surface of cathodes 90. According to an exemplary embodiment, the polarity of power supply 70 is reversible between the first configuration shown in FIG. 2 and a second configuration where anodes 80 become cathodes 90 and cathodes 90 become anodes 80. Applying a current and potential in the second configuration may cause the deposited first contaminant 40 or second contaminant 50 to separate from the surface of the electrode and enter solution 30.

Figure 3:
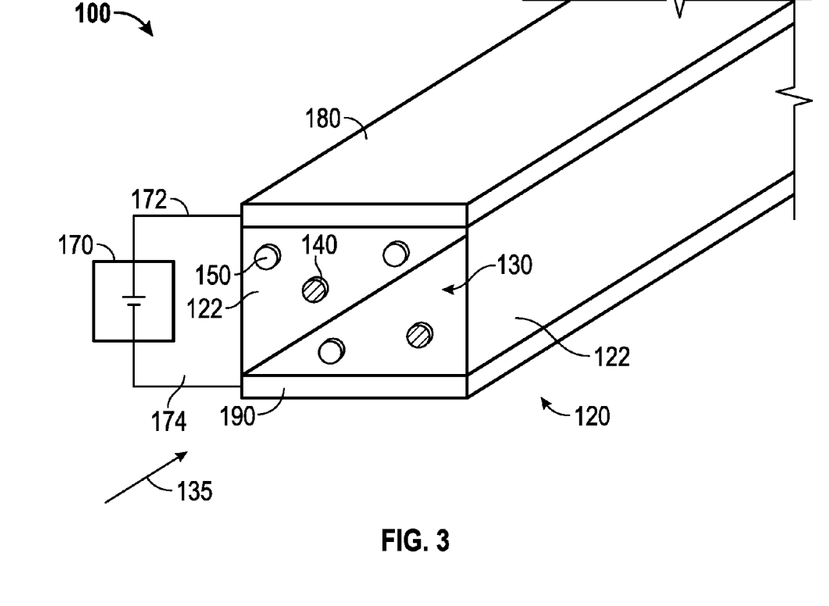
FIG. 3 is an elevation view of an electrochemical reactor having a plurality of walls that form electrodes.

Referring next to FIG. 3, variable or constant flow electrolysis is performed using an electrolysis processing unit, shown as electrochemical reactor 100. Such an electrochemical reactor 100 may be utilized to extract various contaminants. According to an alternative embodiment, electrochemical reactor 100 may be utilized to pre-process ore before it is sent to a mill because a mill may not accept ore having more than a threshold amount of arsenic or another material. As shown in FIG. 3, electrochemical reactor 100 includes a housing, shown as tubular structure 120. Such a tubular structure 120 may include an upper wall, shown as anode 180, a lower wall, shown as cathode 190, and a plurality of adjoining walls, shown as sidewalls 122. According to the exemplary embodiment shown in FIG. 3, sidewalls 122 are manufactured from an electrical insulator (e.g., a polymer, a natural material, etc.) to electrically separate anode 180 and cathode 190. In other embodiments, the roles of the top and bottom plates may be reversed (e.g., the upper wall may serve as an anode, and the lower wall may serve as a cathode. In still other embodiments, the role of the sidewalls and the top and bottom walls may be reversed (e.g., the top and bottom walls may be insulators while the sidewalls may be the cathode or anode electrodes).

According to an exemplary embodiment, sidewalls 122 extend from edges of anode 180 and cathode 190. As shown in FIG. 3, sidewalls 122 are perpendicular to an inner surface of anode 180 and an inner surface of cathode 190 such that tubular structure 120 has a rectangular cross section. According to various alternative embodiments, tubular structure 120 may include more or fewer walls arranged in various known configurations such that the cross-section of tubular structure 120 has a different shape (e.g., triangular, pentagonal, hexagonal, etc.).

According to the exemplary embodiment shown in FIG. 3, tubular structure 120 contains (i.e. surrounds, envelops, etc.) a fluid, shown as solution 130. According to an exemplary embodiment, solution 130 is an unpurified fluid (e.g., water containing various bacteria or other undesirable minerals). According to an alternative embodiment, solution 30 may be a waste fluid (e.g., wastewater, industrial waste, comminution water, mine tailings, etc.).

As shown in FIG. 3, solution 130 moves along a longitudinal axis of tubular structure 120, shown as flow direction 135. According to an exemplary embodiment, solution 130 is moved along flow direction 135 with one of a gravity head and a pump. Such a pump may include a piston pump, a centrifugal pump, or another known device capable of moving solution 130 along flow direction 135. The pump may be controlled by a module (i.e. controller, processing unit, etc.) configured to regulate the flow of the fluid through tubular structure 120. According to an exemplary embodiment, tubular structure 120 includes an inner chamber having an inlet and an outlet, and a pump pressurized (e.g., 15 pounds per square inch, 20 pounds per square inch, etc.) solution 130. Pressurizing solution 130 may provide various advantages such as increasing the processing rate of electrochemical reactor 100 and overcoming friction losses of solution 130 to facilitate the flow of solution 130 through tubular structure 120.

Referring still to the exemplary embodiment shown in FIG. 3, electrochemical reactor 100 includes an electrical energy source, shown as power supply 170. As shown in FIG. 3, power supply 70 is coupled to anode 180 with a current delivering lead 172 and cathode 190 with a current receiving lead 174. According to an exemplary embodiment, cathode 190 is positioned along a lower portion of tubular structure 120. Such a configuration may facilitate a cathodic deposition process of electrochemical reactor 100 by allowing both gravitational and electromagnetic forces to act on constituent particles. In other embodiments gravitational forces on the constituent particles may be relatively unimportant, and the cathode may be associated with either the top wall, the bottom wall, or with side or inclined walls.

According to an exemplary embodiment, coupling power supply 70 with anode 180 and cathode 190 facilitates the electrodeposition process of electrochemical reactor 100. As shown in FIG. 3, solution 130 includes a first constituent particle, shown as first contaminant 140 and a second constituent particle, shown as second contaminant 150.

According to an exemplary embodiment, at least one of first contaminant 140 and second contaminant 150 are cyanide, mercury, or arsenic. According to an alternative embodiment, at least one of first contaminant 140 and second contaminant 150 are a mineral (e.g., gold, silver, etc.). As discussed above, applying a current and potential across anode 180 and cathode 190 initiates the treatment of solution 130 at a processing rate.

Figure 4:
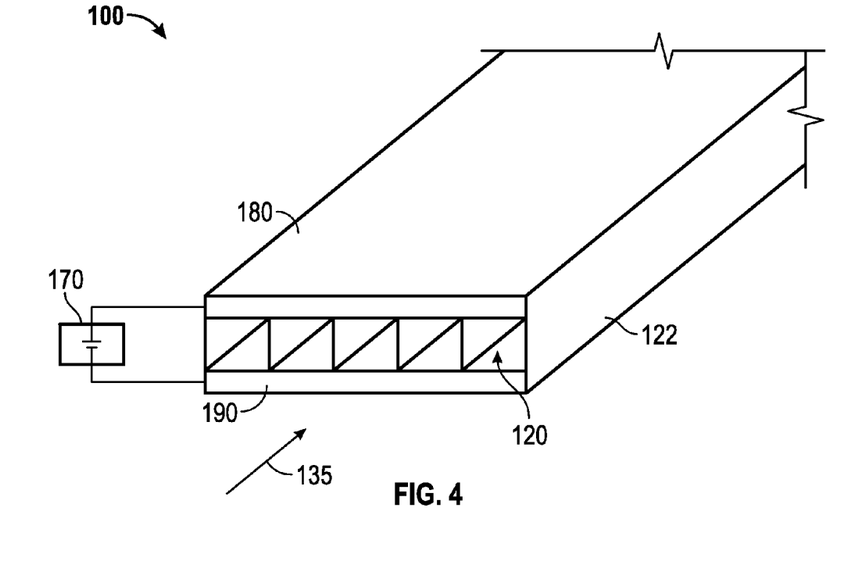
FIG. 4 is an elevation view of an electrochemical reactor having a plurality of tubular flow paths.

Referring next to the exemplary embodiment shown in FIG. 4, electrochemical reactor 100 includes a plurality of channels, shown as tubular structures 120. As shown in FIG. 4, five tubular structures 120 are adjacently positioned to form a one by five array. According to an exemplary embodiment, the adjacent tubular structures include a common anode 180 spaced a specified distance (e.g., 0.01 centimeters, 0.1 centimeters, 0.9 centimeters, etc.) from a common cathode 190. According to an exemplary embodiment, spacing anode 180 a short distance (e.g., 0.01 centimeters, 0.1 centimeters, 0.9 centimeters) from cathode 190 facilitates the electrodeposition of first contaminant 140 or second contaminant 150 due to the physical proximity of the constituent particles to cathode 190. According to various alternative embodiments, electrochemical reactor 100 may include more or fewer tubular structures 120 or the plurality of tubular structures may be arranged in an array having different dimensions. According to yet another alternative embodiment, the plurality of tubular structures 120 may each have separate (i.e. not common) anodes 180, cathodes 190, and sidewalls 122.

According to an alternative embodiment, the plurality of tubular structures 120 may be adjacently positioned in a larger array (e.g., having 100 vertically spaced layers, each holding 120 side-by-side tubular structures). The top wall of a tubular structure in one vertical layer may serve as the bottom wall of a vertically adjacent tubular structure in the layer just above it. These common walls can be electrically connected such that cells in adjacent vertical layers are oppositely polarized (e.g., the anodes may be the bottom wall of tubular structures in one layer, but anodes are the top wall of tubular structures in layers above or below it).

Referring still to the exemplary embodiment shown in FIG. 4, a fluid may be moved along a longitudinal axis of the tubular structures, shown as flow direction 135. Such a configuration of tubular structures subdivides the fluid flow into a plurality of parallel streams each having a rectangular cross section. According to an exemplary embodiment, a pump may flow the fluid through the tubular structure at a flow velocity. Such a flow velocity may be related to a pressure imparted on the fluid by the pump, the physical characteristics (e.g., size, surface finish, etc.) of the tubular structure, or still other conditions.

According to an exemplary embodiment, electrochemical reactor 100 separates first contaminant 140 and second contaminant 150 from solution 130 and plates (i.e. deposits, positions, etc.) them onto one of the anode 180 and cathode 190. Such plating may occur through various mechanisms. By way of example, in some embodiments, gravity may force first contaminant 140 and second contaminant 150 downwards towards the bottom of tubular structure 120.

According to an exemplary embodiment, first contaminant 140 and second contaminant 150 are ions having a charge and power supply 170 creates an electrical potential between anode 180 and cathode 190. The first contaminant 140 and a second contaminant 150 in ionic form each have an electrical mobility related to the ability of the charged particle to move through solution 130 in response to the electrical potential applied by power supply 170. By way of example, a particle within a field for a period of time and having a greater electrical mobility moves a greater distance than another particle having a lower electrical mobility. According to an exemplary embodiment, first contaminant 140 and second contaminant 150 have equal electrical mobilities. According to an alternative embodiment, first contaminant 140 and second contaminant 150 have different electrical mobilities.

According to an exemplary embodiment, power supply 170 creates an electrical potential between cathode 190 and anode 180. When flowed through the electrical potential, the charged particles of first contaminant 140 and second contaminant 150 experience electrophoresis and move towards the oppositely charged electrode due to electromagnetic forces. By way of example, a flow of electrons towards cathode 190 may produce a local negative charge thereby electromagnetically attracting particles of first contaminant 140 and second contaminant 150 having a positive net charge. Similarly, the flow of electrons away from anode 180 may produce a local positive charge thereby electromagnetically attracting particles of first contaminant 140 and second contaminant 150 having a negative net charge. While this discussion focuses on the deposition process of electrochemical reactor 100, the concepts described above are equally applicable to the various other embodiments described herein.

Figure 5:
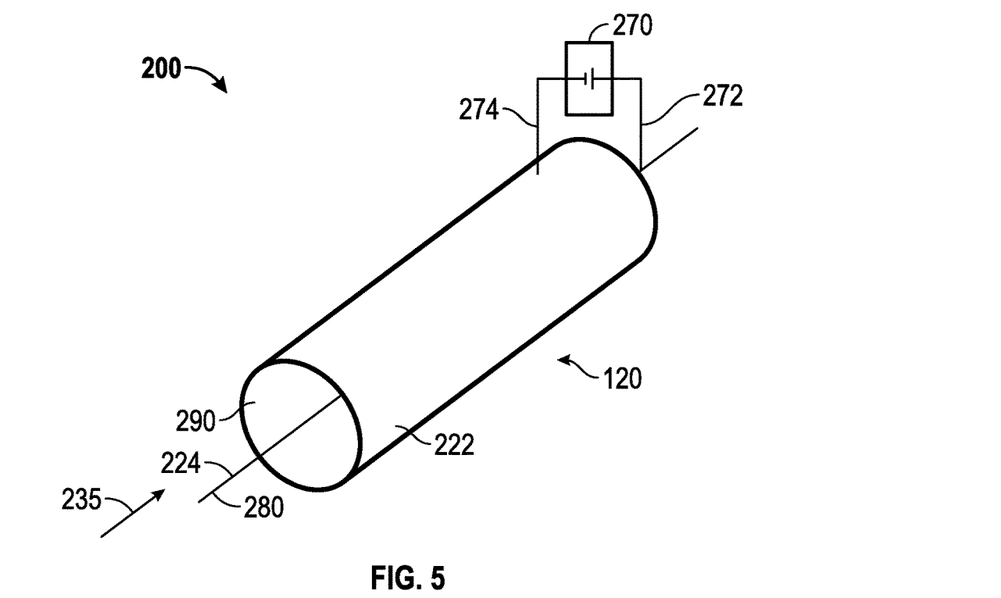
FIG. 5 is an elevation view of an electrochemical reactor having a tubular wall structure and a wire positioned along a central axis of the tubular wall structure.

Referring next to the exemplary embodiment shown in FIG. 5, an electrolytic process is performed using an electrolysis processing unit, shown as electrochemical reactor 200. As shown in FIG. 5, electrochemical reactor 200 includes a structural member, shown as housing 220. According to an exemplary embodiment, housing 220 includes a wall member, shown as tube 222 that at least partially surrounds a wire, shown as wire 224. As shown in FIG. 5, tube 222 has a circular cross section, and wire 224 is disposed along a central axis of tube 222. According to an exemplary embodiment, tube 222 has a diameter of less than one centimeter (e.g., less than one millimeter, one millimeter, five millimeters, etc.).

According to various alternative embodiments, tube 222 may have a differently shaped cross section (e.g., ovular, triangular, pentagonal, hexagonal, etc.), or wire 224 may be disposed along another longitudinal axis of tube 222. According to still another alternative embodiment, wire 224 may include a plurality of loops, bends, or coils. By way of example, such a configuration may increase the strength of an electrical potential applied between tube 222 and wire 224 thereby facilitating the electrodeposition process of electrochemical reactor 200.

Referring still to the exemplary embodiment shown in FIG. 5, electrochemical reactor 200 includes an electrical energy source, shown as power supply 270. According to an exemplary embodiment, a current delivering lead 272 of power supply 270 is coupled to wire 224 thereby forming a current receiving electrode, shown as anode 280. Power supply 270 also includes a current receiving lead 274 coupled to tube 222 thereby forming a current delivering electrode, shown as cathode 290. According to an alternative embodiment, the current receiving lead 274 of power supply 270 is coupled to wire 224 thereby forming cathode and current delivering lead 272 of power supply 270 is coupled to tube 222 thereby forming an anode.

According to an exemplary embodiment, electrochemical reactor 200 may include a solution configured to flow along flow direction 235. As discussed above, an applied current and potential across anode 280 and cathode 290 initiates the electrodeposition process of electrochemical reactor 200.

Such an electrodeposition process may be cathodic deposition where positively charged particles within the fluid are drawn towards tube 222 or anodic deposition where negatively charged particles within the fluid are drawn towards wire 224.

Figure 6:
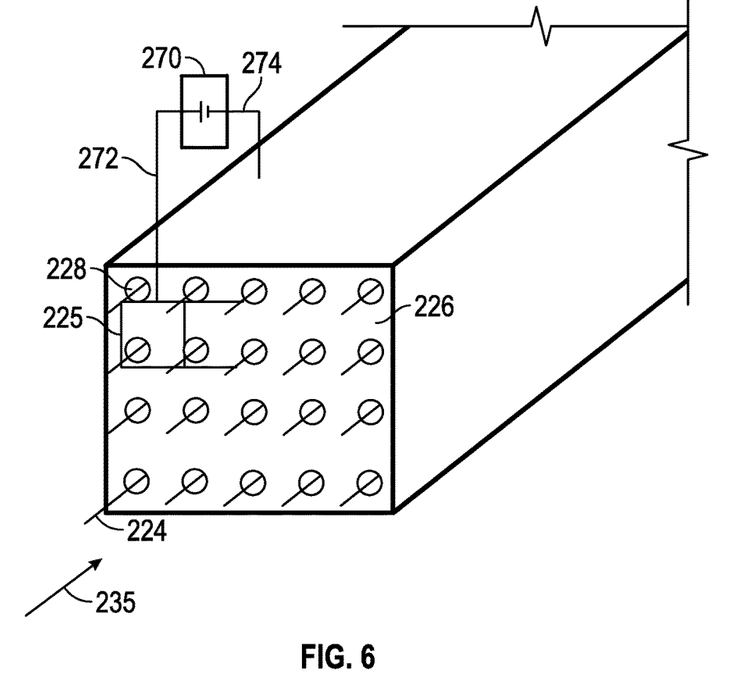
FIG. 6 is an elevation view of an electrochemical reactor having a plurality of tubular flow paths.

Referring next to the alternative embodiment shown in FIG. 6, electrochemical reactor 200 includes a structural element, shown as housing 226. As shown in FIG. 6, housing 226 is an elongated member having a rectangular cross section. According to an alternative embodiment, housing 226 may have different cross-sectional shape. According to an exemplary embodiment, housing 226 defines a plurality of voids, shown as apertures 228, and electrochemical reactor 200 includes a plurality of wires (i.e. fibers, elongated members, protrusions, etc.), shown as wires 224. As shown in FIG. 6, wires 224 are disposed along a central axis of apertures 228. According to an exemplary embodiment, wires 224 extend past an end of housing 226 and are coupled together with a plurality of wires, shown as jumpers 225 (for clarity, not all jumper wires shown). Series parallel configurations of housings 226 or tubes 228 within a housing, where the configurations ensure the same current flows through each wire 224, may be made to control the impedance seen by the power supply 270. According to an alternative embodiment, wires 224 may not extend past the ends of housing 226 and may instead exit housing through sidewalls of apertures 228.

Referring still to the exemplary embodiment shown in FIG. 6, electrochemical reactor 200 includes an electrical energy source, shown as power supply 270. According to an exemplary embodiment, power supply 270 includes a current delivering electrode coupled to wires 224 thereby forming an anode and a current receiving lead 274 coupled to housing 226 thereby forming a cathode. As discussed above, an applied current and potential across the anode and the cathode initiates the electrodeposition process of electrochemical reactor 200. Such an electrodeposition process may be cathodic deposition where positively charged particles within the fluid are drawn towards housing 226 or anodic deposition where negatively charged particles within the fluid are drawn towards wires 224. The power supply 270 may be operated at a voltage which preferentially deposits a particular contaminant. A second voltage may then be used to preferentially deposit another contaminant. This may or may not be preceded by deplating of a previously deposited contaminant.

According to an exemplary embodiment, various components of the electrochemical reactor include surfaces configured to aid in the collection and retention of particles within the solution, such as the first contaminant and second contaminant, at the electrodes. Such a surface may be manufactured from a variety of materials that promote or inhibit wetting of the first contaminant and the second contaminant. By way of example, cathodic deposition may be facilitated by manufacturing the anode from a metal having a flat and smooth surface to inhibit wetting. According to an alternative embodiment, cathodic deposition may be facilitated by forming specific features (e.g., slots, holes, striations, etc.) within the cathode. Cathodic deposition may be further facilitated by manufacturing the cathode from a material that wets the solution less than the first contaminant or the second contaminant.

According to an exemplary embodiment, tubular structure 120, tube 222, and housing 226 include materials that promote wetting at the cathode to facilitate cathodic deposition. Such materials may provide a lower total interface energy for the cathode to the first contaminant or the second contaminant and the cathode to the solution than the interface energy of the solution to the cathode. According to an alternative embodiment, the cathode may include a coating configured to promote wetting. According to yet another alternative embodiment, the anode, the cathode, or the various components of the electrochemical reactor may include a coating configured to inhibit wetting. While the foregoing discussion has emphasized the presence of particular materials or coatings to promote cathodic deposition, it should be understood that such materials or coatings may be similarly applied to promote anodic deposition.

Figure 7:
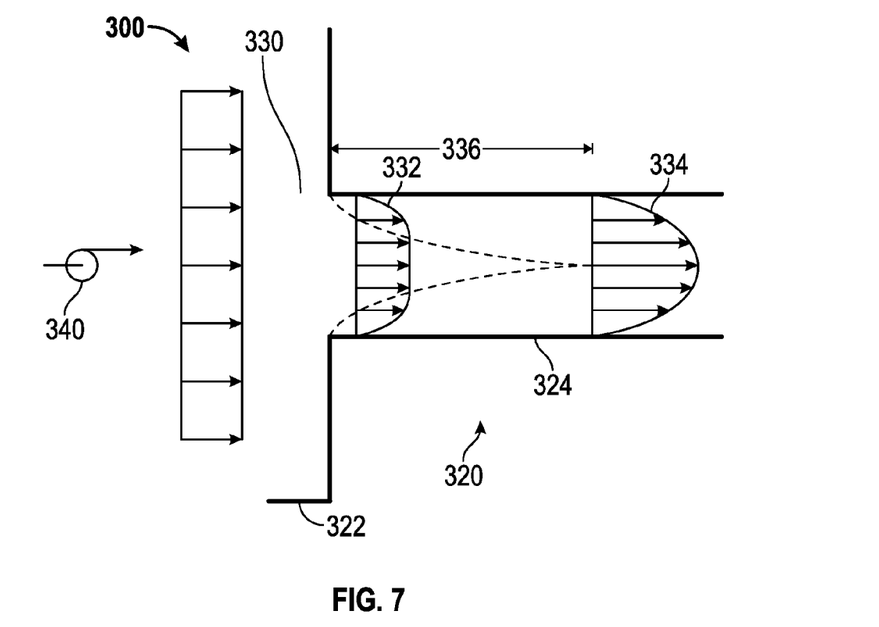
FIG. 7 is an elevation view of a flow path through an elongated tubular structure.

Referring next FIG. 7, the flow of a fluid, shown as solution 330, though a housing, shown as tubular structure 320 is shown according to an exemplary embodiment. As shown in FIG. 7, flow of solution 330 begins having a uniform flow profile in an expanded portion, shown as basin 322. According to an exemplary embodiment, an electrochemical reactor includes such a basin 322 to facilitate the division of a single flow path into a plurality of smaller flow channels. As shown in FIG. 7, a prime mover, shown as pump 340 provides solution 330 to basin 322 with the uniform flow profile. As solution 330 transitions into a tubular portion, shown as channel 324 of tubular structure 320, the flow begins to develop. As shown in FIG. 7, solution 330 includes a first flow profile 332 proximate a transition between basin 322 and channel 324. Solution 330 develops as it flows through channel 324 until it reaches a fully developed state, shown as developed flow 334 after traveling a distance, shown as entrance length 336.

According to an exemplary embodiment, the flow of solution 330 through channel 324 is laminar. According to an exemplary embodiment, the Reynolds number for the flow of solution 330 through channel 324 is less than 2300. Such a laminar flow is characterized by smooth transitions without sudden velocity or pressure fluctuations. According to an exemplary embodiment, laminar flow through one or more components may be advantageous in an electrochemical reactor. By way of example, an electrochemical reactor may include a solution exhibiting laminar flow over a plurality of electrodes.

According to an exemplary embodiment, the flow of the solution is laminar over at least the electrode onto which the contaminants are deposited (e.g., the anode for anodic deposition or the cathode for cathodic deposition). Laminar flow across these electrodes may facilitate the deposition process by reducing the sudden fluctuations associated with turbulent flow. An electrochemical reactor having a smooth profile may more readily allow contaminants to adhere and remain coupled to the electrode. By way of example, a smooth transition interface between the solution and a sidewall may prevent the deposited contaminant from being swept (i.e. decoupled, disengaged, removed, etc.) from the surface of the electrode. Therefore, laminar flow of the solution may facilitate the processing rate by reducing the amount of contaminant material that must be deposited for a second time or allowing for an increased flow velocity. According to an alternative embodiment, first flow profile 332 includes transitional or turbulent flow and solution 330 thereafter develops into laminar flow after traveling a distance within channel 324.

Figure 8:
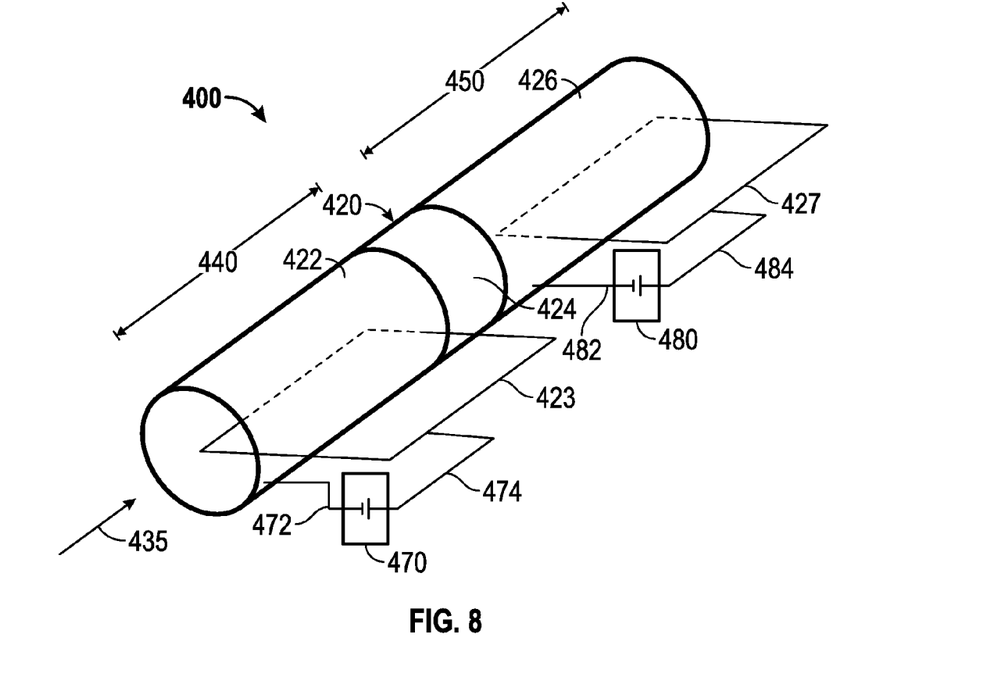
FIG. 8 is an elevation view of an electrochemical reactor having a plurality of zones and multiple power supplies.

Referring next to the exemplary embodiment shown in FIG. 8, a differential electrolytic process is performed using an electrolysis processing unit, shown as electrochemical reactor 400. According to an exemplary embodiment, electrochemical reactor 400 allows for the differential deposition of various contaminants. As shown in FIG. 8, electrochemical reactor 400 includes a housing, shown as tubular assembly 420. According to an exemplary embodiment, tubular assembly 420 includes a first section, shown as first tube 422 coupled to a second section, shown as second tube 426 with a coupler, shown as joint member 424. According to an alternative embodiment, tubular assembly 420 may include additional sections. Such additional sections may be arranged in series, arranged parallel to one another, or arranged in another configuration. As shown in FIG. 8, first tube 422, joint member 424, and second tube 426 have a circular cross section. According to an alternative embodiment, first tube 422, joint member 424, and second tube 426 may have a different cross sectional profile (e.g., triangular, rectangular, etc.). According to an exemplary embodiment, electrochemical reactor 400 includes a first wire (i.e. fiber, elongated member, protrusion, etc.), shown as first wire 423 and a second wire, shown as second wire 427.

According to an exemplary embodiment, first tube 422 and second tube 426 are manufactured from a conductive material. Such a conductive material may include an inert material (e.g., platinum, gold, graphite, a noble metal, another carbon-based material, etc.) that does not partake in the electrodeposition process of electrochemical reactor 400 or may include another conductor (e.g., copper, nickel, etc.). According to an exemplary embodiment, joint member 424 is manufactured from an electrical insulator configured to isolate first tube 422 from second tube 426. According to an alternative embodiment, tubular assembly 420 may include a different type of coupler disposed between first tube 422 and second tube 426, or tubular assembly 420 may not include joint member 424.

As shown in FIG. 8, electrochemical reactor 400 includes a first electrical energy source, shown as first power supply 470 and a second electrical energy source, shown as second power supply 480. According to an exemplary embodiment, first power supply 470 is coupled to a surface of first tube 422 with a current receiving lead 472 thereby forming a cathode and first wire 423 with a current delivering lead 474 thereby forming an anode. Second power supply 480 may be similarly coupled to second tube 426 with a current receiving lead 482 and second wire 427 with a current delivering lead 484.

According to an alternative embodiment, first power supply 470 and second power supply 480 are coupled to the various components of an electrochemical reactor to form different configurations of anodes and cathodes. Such a configuration may include a reversal of the leads shown in FIG. 8 such that the surfaces of first tube 422 and second tube 426 define anodes rather than cathodes. Still another configuration may include a reversal of the leads coupled to first tube 422 and first wire 423 thereby defining an anode along a surface of first tube 422 and a cathode along a surface of second tube 426. According to yet another alternative embodiment, electrochemical reactor 400 may include a single electrical energy source or more than two electrical energy sources.

According to an exemplary embodiment, electrochemical reactor 400 includes a first treatment zone, shown as first zone 440 and a second treatment zone, shown as second zone 450. As shown in FIG. 8, first zone 440 is defined along the length of first tube 422 and second zone 450 is defined along the length of second tube 426. According to an exemplary embodiment, a fluid may be flowed along a longitudinal axis of first tube 422, shown as flow direction 435, with a pump controlled by a module to regulate the volumetric flow or velocity of the solution. Such flow may be laminar to facilitate an electrodeposition process of electrochemical reactor 400. According to an exemplary embodiment, the fluid includes a first contaminant and a second contaminant. Such a first contaminant and a second contaminant may be various materials (e.g., cyanide, mercury, arsenic, gold, silver, etc.) having a zero net charge, a positive net charge, or a negative net charge.

According to an exemplary embodiment, first power supply 470 is configured to apply a first current and potential across the electrodes of first zone 440 and second power supply 480 is configured to apply a second current and potential across the electrodes of second zone 450. According to an alternative embodiment, a single power supply may apply the various currents and potentials across the electrodes of first zone 440 and second zone 450. According to an exemplary embodiment, fluid flows through tubular assembly 420, and a first contaminant having a net positive charge adheres to in interior surface of first tube 422 whereas a second contaminant also having a net positive charge adheres to the interior surface of second tube 426. According to an exemplary embodiment, the electrochemical potential of the first contaminant differs from the second contaminant and the potentials applied in the first zone 440 and the second zone 450 are different. By way of example, the potential applied in first zone 440 may be smaller in the first zone thereby removing the contaminant having a greater electrochemical potential, and the potential applied in second zone 450 may be greater to remove the contaminant having a smaller electrochemical potential. Selective removal of contaminants from the fluid can occur in either or both zones due to differences in the mobilities of the contaminants. According to an exemplary embodiment, the electrical mobility or the magnitude of the applied current or potential contribute to the processing rate of the electrochemical reactor.

According to an exemplary embodiment, the potential applied across the electrodes of first zone 440 is specified with a module (i.e. controller, processing unit, etc.) to facilitate the electrodeposition of the first contaminant, and the potential applied across the electrodes of second zone 450 is specified with the module to facilitate the electrodeposition of the second contaminant. According to an alternative embodiment, tubular assembly 420 may include other components or features configured to facilitate differential plating of the various contaminants within the fluid. Such additional features may include components manufactured from materials to inhibit or promote wetting of a particular contaminant or a coating configured to inhibit or promote wetting of a particular contaminant, among other known techniques to extract one contaminant. While the foregoing discussion emphasized an arrangement of wires positioned with various tubular structures, it should be understood that a similar electrochemical reactor may be formed with spaced plates, walls, or another physical configuration.

Referring still to the exemplary embodiment shown in FIG. 8, recovery of the various contaminants is accomplished through differential de-plating. Such a de-plating process may be utilized to recover (i.e. plate out of solution and then differentially de-plate) gold or other minerals. According to an exemplary embodiment, the first contaminant is initially disposed along an inside wall of first tube 422 and the second contaminant is initially disposed along an inside wall of second tube 426. Such contaminants may remain in position even after the pump stops flowing the solution through the tubular assembly. According to an exemplary embodiment, the various contaminants may be removed from tubular assembly 420 by removing and cleaning or replacing first tube 422 and second tube 426. Such a process may involve additional expense and labor needed to remove and clean or replace the component but may simplify the design of an electrochemical reactor.

According to an alternative embodiment, the electrochemical reactor may differentially de-plate the various contaminants from the inner surfaces of first tube 422 and second tube 426. According to an exemplary embodiment, differential de-plating is accomplished by reversing the polarity of the leads of each power supply to perform the previously accomplished electrodeposition process in reverse. Referring again to FIG. 8, such a reverse in polarity may be accomplished by coupling current receiving lead 472 to first wire 423 thereby forming a cathode and current delivering lead 474 to the surface of first tube 422, thereby forming an anode. According to an exemplary embodiment, reversing the polarity defines a cathode along a previously anodic surface and an anode along a previously cathodic surface. Such a reversal also reverses the flow of electrons thereby releasing the contaminants from the surface of the electrode.

According to an exemplary embodiment, the polarity of the electrodes within first zone 440 may be reversed while the polarity of the electrodes within second zone 450 remains unchanged. This configuration allows for the differential recovery of the contaminant deposited within first zone 440. Thereafter, the polarity of the electrodes within second zone 450 may be reversed to differentially recover the contaminant deposited within second zone 450. According to an alternative embodiment, the polarity of the electrodes within first zone 440 and second zone 450 may be simultaneously reversed to create a solution of highly concentrated contaminants. According to an embodiment, the magnitude of the applied potential may be selected to differentially deplate contaminants. By way of example, a first contaminant having an electrochemical potential smaller than the applied potential may be deplated, while another, copresent contaminant whose electrochemical potential is greater the applied potential will not be significantly deplated.

According to an exemplary embodiment, the de-plating process uses a pump to flow a fluid through tubular assembly 420 to differentially collect the various contaminants. According to an exemplary embodiment, the fluid includes a constituent particle configured to facilitate the de-plating of the contaminant from the surface of the electrode. Such a constituent particle may include an ion that bonds with the contaminant in solution and may be thereafter collected. According to an exemplary embodiment, the fluid is the same fluid initially flowed through tubular assembly 420. Where substantially all (i.e. more than ninety percent of the particles) of the contaminants have been plated onto surfaces of tubular assembly 420, such a fluid may include few dissolved particles. According to an alternative embodiment, a second fluid is flowed through tubular assembly to facilitate the de-plating process of at least one of the contaminants. Such a second fluid may include a variety of substances (e.g., water, an electrolyte, etc.). According to still another alternative embodiment, additional fluids are flowed through tubular assembly 420 to differentially de-plate each contaminant with a separate fluid. These various configurations allow for the storage of the contaminants differentially within separate solutions or collectively in a single solution.

According to an exemplary embodiment, the initial fluid may be pumped through tubular assembly 420 a single time to remove substantially all of the contaminants. According to an alternative embodiment, the initial fluid may be pumped through tubular assembly 420 more than once to further reduce the prevalence of the various contaminants.

According to still another alternative design, the various components of tubular assembly 420 may have different cross-sectional areas to plate or de-plate specific contaminants at different rates. A module may also increase or decrease the applied current or potential to vary the plating or de-plating rate of a particular contaminant.

According to an exemplary embodiment, electrochemical reactor 400 may cycle between plating and de-plating. Such cycling may involve plating by applying a current or a potential across the electrodes of a first polarity for a period of time and then reversing the polarity of the electrodes to de-plate for a period of time. According to an exemplary embodiment, the cycle involves plating for a period of twenty-three hours and de-plating for a period of one hour. According to an alternative embodiment, the cycle may vary depending on the operating conditions and requirements of electrochemical reactor 400. Such a de-plating process may also involve applying a larger current across the electrodes to increase the rate that contaminants are de-plated from the electrodes thereby reducing the time needed to de-plate. According to an alternative embodiment, electrochemical reactor 400 may be configured to plate then de-plate a small number of contaminants (e.g., one, two, four, etc.) from the solution. Such a configuration may allow for the removal of numerous contaminants by re-cycling the solution through electrochemical reactor 400 and may reduce the number of electrodes, power supplies, or other components utilized to remove numerous contaminants from the solution.

According to an alternative embodiment, contaminants may be de-plated using flow-phased recovery. Such a flow-phased recovery may reduce the total volume and increase the concentration of contaminated fluid produced by an electrochemical reactor. According to an exemplary embodiment, flow-phased recovery is accomplished by flowing a discrete slug of fluid through plurality of tubular sections with a pump controlled by a module. A plurality of sensors may detect the presence of the discrete slug and send a signal to a power supply. Such a power supply may be configured to receive the signal and apply a de-plating current or potential as the discrete slug of fluid flows past. After flowing through the plurality of tubular sections, the discrete slug may contain a variety of contaminant materials. According to an alternative embodiment, the power supply may simultaneously apply a de-plating current or potential across each of the electrodes thereby allowing for de-plating as the discrete slug of fluid passes through.

According to an alternative embodiment, various contaminants may be differentially recovered using a fluid having a first section and a second section. The first section and the second section of the fluid may be separated from one another. Such a first section and a second section may be separated by various mechanisms (e.g., immiscibility, a physical membrane, etc.). As a first section of fluid passes through a region containing a first plated contaminant, the power supply may apply a de-plating current or potential to de-plate the first plated contaminant into the first section of the fluid. Similarly, as a second section of fluid passes through a region containing a second plated contaminant, the power supply may apply a de-plating current or potential to de-plate the second plated contaminant into the second section of the fluid. According to still another alternative embodiment, a fluid containing a plurality of sections may be flowed into a housing and then stopped in a particular orientation. The fluid may be stopped such that a first contaminant is aligned with a first section of the fluid and a second contaminant is aligned with a second section of the fluid. A de-plating current or potential may be applied individually or to each of the electrodes to de-plate the contaminant into separate fluid sections. Thereafter, the flow of the fluid may be resumed, and each section may be differentially recovered (e.g., by opening a valve and releasing each fluid section into a different container).

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although a certain order of method steps may be described for the various exemplary embodiments discussed herein, the order of the steps may differ from what is described. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An electrochemical reactor for removing mining constituents from a fluid, comprising:
   a housing including a plurality of channels defining flow paths, wherein each of the plurality of channels includes a top plate, a bottom plate, and a plurality of sidewalls coupling the top plate to the bottom plate, wherein the top plate, the bottom plate, and the plurality of sidewalls thereby enclose the flow paths;
   a power supply coupled to the top plate and the bottom plate of at least one of the plurality of channels;
   an anode and a cathode coupled to the power supply, wherein the top plate of the at least one of the plurality of channels is coupled to a current receiving lead of the power supply thereby forming the cathode, and wherein the bottom plate of the at least one of the plurality of channels is coupled to a current delivering lead of the power supply thereby forming the anode; and
   a controller configured to selectively engage the power supply, wherein the power supply applies an electrical potential between the anode and the cathode when engaged.

2. The apparatus of claim 1, the top plate of the at least one of the plurality of channels defining a first top plate and the bottom plate of the at least one of the plurality of channels defining a first bottom plate, wherein the first bottom plate is electrically and structurally coupled to a second top plate of a second channel.

3. The apparatus of claim 2, wherein a second bottom plate of the second channel is coupled to the current receiving lead of the power supply thereby forming the cathode.

4. The apparatus of claim 1, wherein the at least one of the plurality of channels includes an elongated member disposed along a longitudinal axis of the housing.

5. The apparatus of claim 4, wherein the elongated member comprises a wire.

6. The apparatus of claim 4, wherein the elongated member is positioned along a central axis of the at least one of the plurality of channels.

7. The apparatus of claim 1, wherein the plurality of channels are distributed in a rectangular array within the housing.

8. The apparatus of claim 1, wherein the plurality of channels are distributed in a hexagonal array within the housing.

9. The apparatus of claim 1, wherein the at least one of the plurality of channels is electrically insulated from a second of the plurality of channels.

10. The apparatus of claim 9, wherein the controller is configured to apply a first electrical potential within a first channel and a second electrical potential within a second channel.

11. The apparatus of claim 1, further comprising a fluid disposed within the housing.

12. The apparatus of claim 11, wherein the fluid includes a constituent.

13. The apparatus of claim 12, wherein the constituent comprises an ion having an electrical mobility.

14. The apparatus of claim 13, wherein the fluid includes a second ionic constituent having a second electrical mobility.

15. The apparatus of claim 12, wherein the fluid includes a second constituent.

16. The apparatus of claim 1, wherein the at least one of the plurality of channels includes a first region extending along a first length of the flow paths and a second region extending along a second length of the flow paths.

17. The apparatus of claim 16, wherein the power supply is configured to apply a first current level in the first region and a second current level in the second region.

18. The apparatus of claim 16, wherein the power supply is configured to apply a first potential in the first region and a second potential in the second region.

19. An electrochemical reactor for removing mining constituents from a fluid, comprising:
  a housing including a plurality of channels defining flow paths, wherein each of the plurality of channels includes a top plate, a bottom plate, and a plurality of sidewalls coupling the top plate to the bottom plate, wherein the top plate, the bottom plate, and the plurality of sidewalls thereby enclose the flow paths;
  a power supply coupled to the top plate and the bottom plate of at least one of the plurality of channels;
  an anode and a cathode coupled to the power supply, wherein the top plate of the at least one of the plurality of channels is coupled to a current delivering lead of the power supply thereby forming the anode, and wherein the bottom plate of the at least one of the plurality of channels is coupled to a current receiving lead of the power supply thereby forming the cathode; and
  a controller configured to selectively engage the power supply, wherein the power supply applies an electrical potential between the anode and the cathode when engaged.

20. The apparatus of claim 19, the top plate of the at least one of the plurality of channels defining a first top plate and the bottom plate of the at least one of the plurality of channels defining a first bottom plate, wherein the first bottom plate is electrically and structurally coupled to a second top plate of a second channel.

21. The apparatus of claim 20, wherein a second bottom plate of the second channel is coupled to the current delivering lead of the power supply thereby forming the anode.

22. The apparatus of claim 19, wherein the at least one of the plurality of channels includes an elongated member disposed along a longitudinal axis of the housing.

23. The apparatus of claim 22, wherein the elongated member comprises a wire.

24. The apparatus of claim 22, wherein the elongated member is positioned along a central axis of the at least one of the plurality of channels.

25. The apparatus of claim 19, wherein the plurality of channels are distributed in a rectangular array within the housing.

26. The apparatus of claim 19, wherein the plurality of channels are distributed in a hexagonal array within the housing.

27. The apparatus of claim 19, wherein the at least one of the plurality of channels is electrically insulated from a second of the plurality of channels.

28. The apparatus of claim 27, wherein the controller is configured to apply a first electrical potential within a first channel and a second electrical potential within a second channel.

29. The apparatus of claim 19, further comprising a fluid disposed within the housing.

30. The apparatus of claim 29, wherein the fluid includes a constituent.

31. The apparatus of claim 30, wherein the constituent comprises an ion having an electrical mobility.

32. The apparatus of claim 31, wherein the fluid includes a second ionic constituent having a second electrical mobility.

33. The apparatus of claim 30, wherein the fluid includes a second constituent.

34. The apparatus of claim 19, wherein the at least one of the plurality of channels includes a first region extending along a first length of the flow paths and a second region extending along a second length of the flow paths.

35. The apparatus of claim 34, wherein the power supply is configured to apply a first current level in the first region and a second current level in the second region.

36. The apparatus of claim 34, wherein the power supply is configured to apply a first potential in the first region and a second potential in the second region.

37. An electrochemical reactor for removing mining constituents from a fluid, comprising:
  a housing including a plurality of channels defining flow paths, each of the plurality of channels including a top plate, a bottom plate, and a plurality of sidewalls;
  an elongated member disposed along a longitudinal axis of the housing;
  a power supply coupled to both (a) at least one of the plurality of channels and (b) the elongated member;
  an anode and a cathode coupled to the power supply, wherein the at least one of the plurality of channels is coupled to one of a current receiving lead and a current delivering lead of the power supply thereby forming one of the cathode and the anode, and wherein the elongated member is coupled to the other of the current receiving lead and the current delivering lead of the power supply thereby forming the other of the cathode and the anode; and
  a controller configured to selectively engage the power supply, wherein the power supply applies an electrical potential between the anode and the cathode when engaged.

* * * * *